(12) United States Patent
Miyazaki

(10) Patent No.: US 7,434,652 B2
(45) Date of Patent: Oct. 14, 2008

(54) HYDRAULIC POWER STEERING APPARATUS

(75) Inventor: Osamu Miyazaki, Kashihara (JP)

(73) Assignee: JTEKT Corporation, Osaka (JP)

( * ) Notice: Subject to any disclaimer, the term of this patent is extended or adjusted under 35 U.S.C. 154(b) by 351 days.

(21) Appl. No.: 11/323,140

(22) Filed: Dec. 30, 2005

(65) Prior Publication Data

US 2006/0169520 A1    Aug. 3, 2006

(30) Foreign Application Priority Data

Jan. 7, 2005    (JP)  ............................. 2005-003137

(51) Int. Cl.
*B62D 5/06*    (2006.01)

(52) U.S. Cl. ........................ 180/417; 180/403; 180/414; 180/419

(58) Field of Classification Search ................... 180/417
See application file for complete search history.

(56) References Cited

U.S. PATENT DOCUMENTS 4,465,101 A    8/1984    Hasegawa

2001/0032750 A1*    10/2001    Serizawa et al. ............ 180/423
2004/0231907 A1*    11/2004    Ishii ........................... 180/307

FOREIGN PATENT DOCUMENTS

| EP | 0 709 276 A2 | 5/1996 |
| JP | 63-240469 A | 10/1988 |
| JP | 02-212271 A | 8/1990 |
| JP | 10-324259 A | 12/1998 |

* cited by examiner

*Primary Examiner*—Joanne Silberman
*Assistant Examiner*—Tashiana Adams
(74) *Attorney, Agent, or Firm*—Darby & Darby P.C.

(57) ABSTRACT

An oil pressure regulating valve of rotary type comprising a valve body and a valve spool is constructed inside a housing having a cylindrical shape. An oil supply port for supplying pressure oil fed from an oil pressure generation source is formed at a position having an offset toward one side relative to the center axis of the housing. A communicating hole in a deep inside of the oil supply port in communication with the inside of the housing is an elongate hole which is long in the direction of offset. As a result, in a hydraulic power steering apparatus, flow sound is reduced effectively that is generated when the pressure oil fed from the oil pressure generation source is supplied to the oil pressure regulating valve inside the housing. Accordingly, quiet operation is achieved.

5 Claims, 4 Drawing Sheets

HYDRAULIC POWER STEERING APPARATUS

CROSS-REFERENCE TO RELATED APPLICATIONS

This Nonprovisional application claims priority under 35 U.S.C. §119(a) on Patent Application No. 2005-3137 filed in Japan on Jan. 7, 2005, the entire contents of which are hereby incorporated by reference.

BACKGROUND OF THE INVENTION

The present invention relates to a hydraulic power steering apparatus comprising an oil pressure regulating valve that is provided inside a housing having a cylindrical shape for supporting a steering shaft and that supplies and discharges hydraulic fluid to and from a power cylinder for steering assist.

A hydraulic power steering apparatus assists steering by means of oil pressure generated by an oil hydraulic cylinder (power cylinder) of double acting type arranged in a steering mechanism, thereby reducing labor work of a driver so as to provide comfortable feeling in steering. In such a hydraulic power steering apparatus, an oil pressure regulating valve for performing supply and discharge operation for oil pressure in response to the direction and the magnitude of a steering torque applied to a steering member such as a steering wheel is arranged between each of two cylinder chambers of a power cylinder and each of an oil hydraulic pump serving as an oil pressure generation source and an oil tank serving as a drain oil destination (see, for example, Japanese Patent Application Laid-Open No. H10-324259(1998)).

An oil pressure regulating valve widely used is of rotary type which utilizes the rotation of a steering shaft for transmitting an operation of a steering member to a steering mechanism. Specifically, the steering shaft is divided into an input shaft connected to the steering member and an output shaft connected to the steering mechanism, while these shafts are coupled coaxially via a torsion bar. Then, into a valve body having a cylindrical shape engaged at one coupling end, a valve spool formed integrally at the other coupling end is fitted in a manner permitting relative rotation. Thus, when a steering torque is applied to the steering shaft, relative angular displacement arises between the valve body and the valve spool, with causing torsion in the torsion bar.

In each of the fitting circumferences of the valve body and the valve spool (that is, the inner periphery of the former and the outer periphery of the latter), a plurality of oil grooves that extend in the axial direction are aligned in the circumferential direction. In each of the valve body and the valve spool, the oil grooves are arranged in a staggered manner in the circumferential direction. When these components are assembled, a plurality of throttle sections for changing throttle areas depending on the relative angular displacement are formed between adjacent oil grooves. Each of these oil grooves is provided with: an oil supply groove and an oil drain groove connected respectively to the oil hydraulic power source and the drain oil destination; and a pair of oil feed grooves each of which is located in between with each oil drain groove on each side of the oil supply groove, and each of which is separately connected to both cylinder chambers of the power cylinder serving as the feed oil destination.

In a neutral state that no steering torque is applied to the steering member so that no torsion is caused in the torsion bar, the throttle sections aligned on the fitting circumferences of the valve body and the valve spool have the same throttle area with each other. At that time, the pressure oil supplied from the oil pressure generation source to the oil supply grooves is distributed and introduced equally to the oil feed grooves adjacent on both sides, then introduced into the oil drain grooves adjacent on the other side, and then discharged to the drain oil destination. At that time, no pressure difference arises between the cylinder chambers in communication with the oil feed grooves. Thus, the power cylinder generates no force.

On the other hand, when a steering torque is applied to the steering member, relative angular displacement arises between the input shaft and the output shaft, with causing torsion in the torsion bar. This causes a change in the throttle areas of the plurality of throttle sections aligned on the fitting circumference. At that time, the high-pressure hydraulic fluid supplied from the oil pressure generation source to the oil supply groove is introduced into one oil feed groove via a throttle section that has an increased throttle area. Thus, a pressure difference arises between one cylinder chamber in communication with one oil feed groove and the other cylinder chamber in communication with the other oil feed groove. In response to the pressure difference, the oil pressure generated by the power cylinder is applied to the steering mechanism, so that steering is assisted.

BRIEF SUMMARY OF THE INVENTION

The hydraulic power steering apparatus having the above-mentioned configuration has a problem that uncomfortable flow sound is generated when the high-pressure hydraulic fluid flows through the inside of the oil pressure regulating valve. This flow sound is generated mainly when the oil flows through the plurality of throttle sections aligned along the fitting circumferences of the valve body and the valve spool. Thus, in the prior art as disclosed in Japanese Patent Application Laid-Open No. H10-324259(1998) and the like, efforts of reducing the flow sound have been performed by adopting an appropriate shape of the throttle sections and by adjusting the shapes of the parts around the throttle sections such as the size of the supply hole for the hydraulic fluid.

In the prior art configuration in which attention is paid on the flow sound generated, associated with the passing through the throttle sections, that is, so-called "shoo" sound, a reduction effect is actually achieved for the specific kind of flow sound. Nevertheless, the oil pressure regulating valve generates also flow sound other than the "shoo" sound, which is caused by various factors.

After various considerations on the mechanism of generation of flow sound caused by other factors, the inventor of the present invention has found that flow sound is generated at a high level in a supply section that supplies the hydraulic fluid from the oil pressure generation source to the oil pressure regulating valve. That is, the valve body of the oil pressure regulating valve having the above-mentioned configuration is retained in a freely revolvable manner in the inside of a housing having a cylindrical shape for supporting the steering shaft. Then, the pressure oil fed from the oil pressure generation source is supplied to a circumferential groove formed in the outer periphery of the valve body, via an oil supply port penetrating the peripheral wall of the housing. Then, the pressure oil is introduced to the inner periphery side via a plurality of oil supply holes opened at predetermined positions of the circumferential groove, so that the pressure oil is supplied to the oil supply grooves aligned along the fitting circumference which is fitted with the valve spool. The flow sound generated in this supply section is a collision sound arising when the high-pressure hydraulic fluid flowing into the housing via the oil supply ports collides with the bottom face of the circumferential groove in the outer periphery of the valve body.

The present invention has been devised in view of this situation. An object of the invention is to provide a hydraulic power steering apparatus in which flow sound generated when pressure oil fed from an oil pressure generation source is supplied to an oil pressure regulating valve inside a housing is reduced effectively, so that quiet operation is achieved.

The hydraulic power steering apparatus according to the present invention is a hydraulic power steering apparatus comprising an oil pressure regulating valve of rotary type that is provided inside a housing having a cylindrical shape for supporting a steering shaft rotating in response to steering and that supplies and discharges pressure oil fed from an oil pressure generation source, to and from a power cylinder for steering assist, characterized in that an oil supply port formed in a shape of a hole elongate in a direction of offset is provided at a position having an offset toward one side relative to a center axis of the housing in order to supply the pressure oil to the oil pressure regulating valve.

In the hydraulic power steering apparatus according to the present invention, an oil supply port for supplying pressure oil to an oil pressure regulating valve provided inside a housing is formed at a position having an offset from the center axis of the housing. Further, the oil supply port has an elongate hole shape which is long in the direction of offset. By virtue of this, the pressure oil flowing into the housing collides slantwise with a wider area of the outer periphery surface of the valve body which is coaxial to the housing. Accordingly, the flow sound caused by this collision, that is, the flow sound associated with the supplying of the pressure oil, is reduced effectively, so that quiet operation is achieved.

The above and further objects and features of the invention will more fully be apparent from the following detailed description with accompanying drawings.

DETAILED DESCRIPTION OF THE INVENTION

Figure 1:
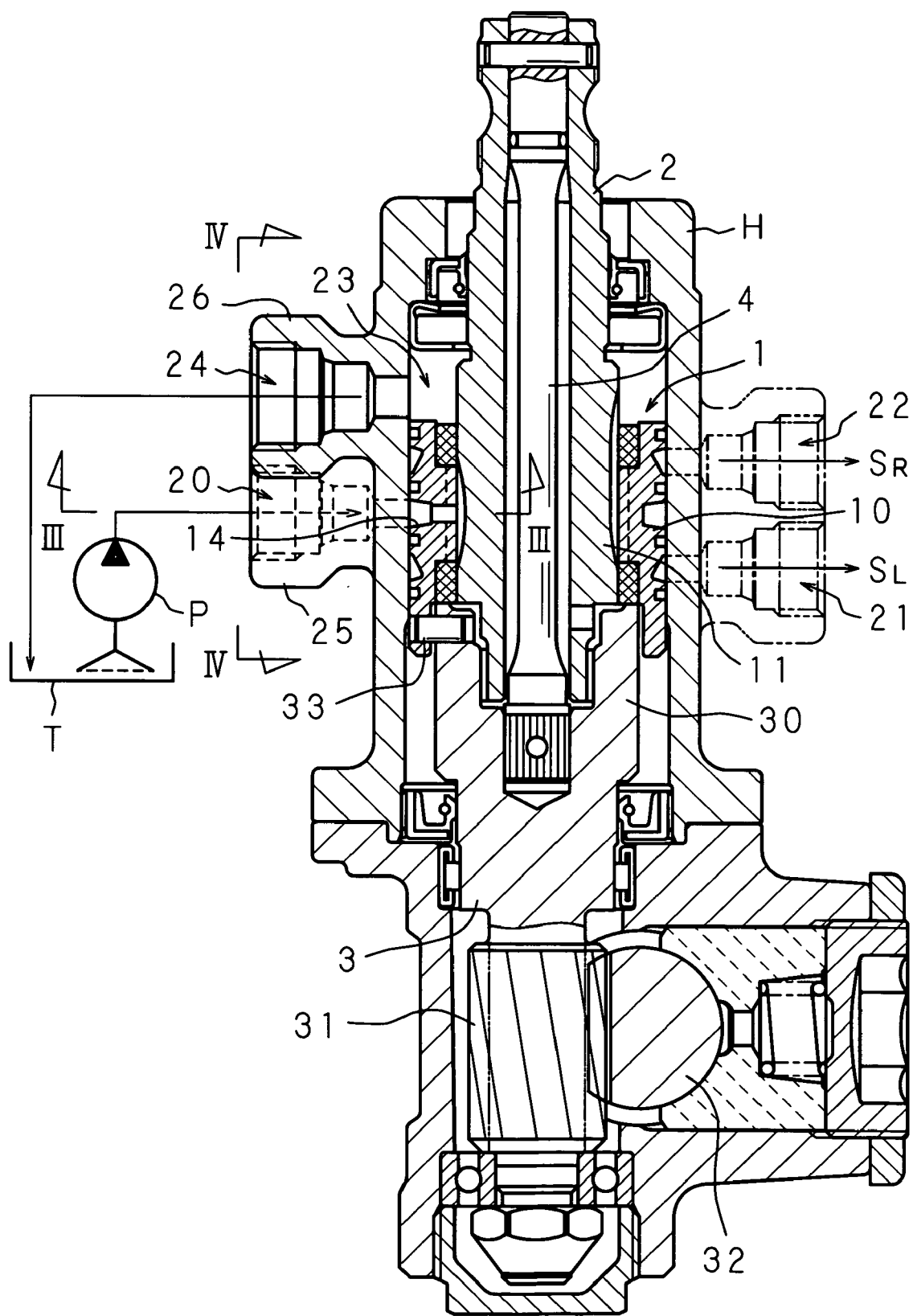
FIG. 1 is a vertical sectional view showing the configuration of a principal part of a hydraulic power steering apparatus according to the present invention.

The present invention is described below in detail with reference to the drawings illustrating embodiments of the invention. FIG. 1 is a vertical sectional view showing the configuration of a principal part of a hydraulic power steering apparatus according to the present invention.

In the figure, numeral 2 indicates an input shaft, while numeral 3 indicates an output shaft. One end part of one of these shafts abuts against one end part of the other shaft, so that these shafts are supported in a manner permitting coaxial rotation inside a housing H having a cylindrical shape. The abutting end (bottom end) of the input shaft 2 constructed in the form of a hollow shaft is inserted and fitted by an approximate length into a cylindrical part 30 formed adjacent to the abutting end (top end) of the output shaft 3. These shafts are supported in a manner permitting relative rotation. Then, the input shaft 2 and the output shaft 3 are connected coaxially by a torsion bar 4 inserted through the hollow section of the input shaft 2.

The upper part of the input shaft 2 protrudes to the outside of the housing H, and then is connected to a steering wheel or the like serving as a steering member not shown. In the lower half part of the output shaft 3, a pinion 31 is formed. The pinion 31 engages with a rack shaft 32 supported under the housing H in a manner intersecting the output shaft 3, so that a steering mechanism of rack and pinion type is constructed that converts the rotation of the pinion 31 into movement in the axial direction of the rack shaft 32 and thereby realizes the steering. As such, the input shaft 2 and the output shaft 3 constitute a steering shaft for transmitting the operation of the steering member to the steering mechanism.

In the connection section between the input shaft 2 and the output shaft 3 having the configuration described above, an oil pressure regulating valve 1 is constructed that comprises a valve body 10 and a valve spool 11. The valve body 10 is a cylindrical member retained in a manner permitting coaxial rotation at an appropriate part of the housing H, and is connected to and integrated with the output shaft 3 by using a dowel pin 33 inserted into the cylindrical part 30 of the upper end of the output shaft 3. Further, the valve spool 11 is formed integrally in the outer periphery on the connection side of the input shaft 2 which is fitted into the valve body 10 in a manner permitting relative rotation.

In each of the inner periphery surface of the valve body 10 and the outer periphery surface of the valve spool 11, a plurality of oil grooves extending in the axial direction are aligned approximately at equal intervals in the circumferential direction in a publicly known manner. These oil grooves are arranged in a staggered manner on the fitting circumferences in the circumferential direction, and thereby constitute a plurality of throttle sections that change the throttle areas between the adjacent oil grooves depending on the relative angular displacement.

Among the oil grooves in the outer periphery of the valve spool 11, a half number of oil grooves (the oil supply grooves) located alternately are in communication with an oil hydraulic pump P serving as an oil pressure generation source via an oil supply port 20 penetrating through the housing H. A feature of the hydraulic power steering apparatus according to the present invention is the configuration of this oil supply port 20. This configuration is described later.

The oil grooves (oil feed grooves) adjacent to the oil supply grooves on both sides in the inner periphery of the valve body 10 are each in communication with each of right and left cylinder chambers SL and SR of a power cylinder (not shown) constructed in the middle of the rack shaft 32, via each of separate cylinder ports 21 and 22 penetrating through the housing H.

The rest half number of oil grooves (the oil drain grooves) in the outer periphery of the valve spool 11 adjacent to the other side of the oil feed grooves extend beyond the fitting region of the valve body 10 as shown in FIG. 1. Then, the oil drain grooves are in communication with a drain oil chamber 23 formed inside the upper housing H of the valve body 10, and then in communication with an oil tank T serving as a drain oil destination via a drain oil port 24 penetrating through the housing H at an appropriate position of the drain oil chamber 23.

Figure 2:
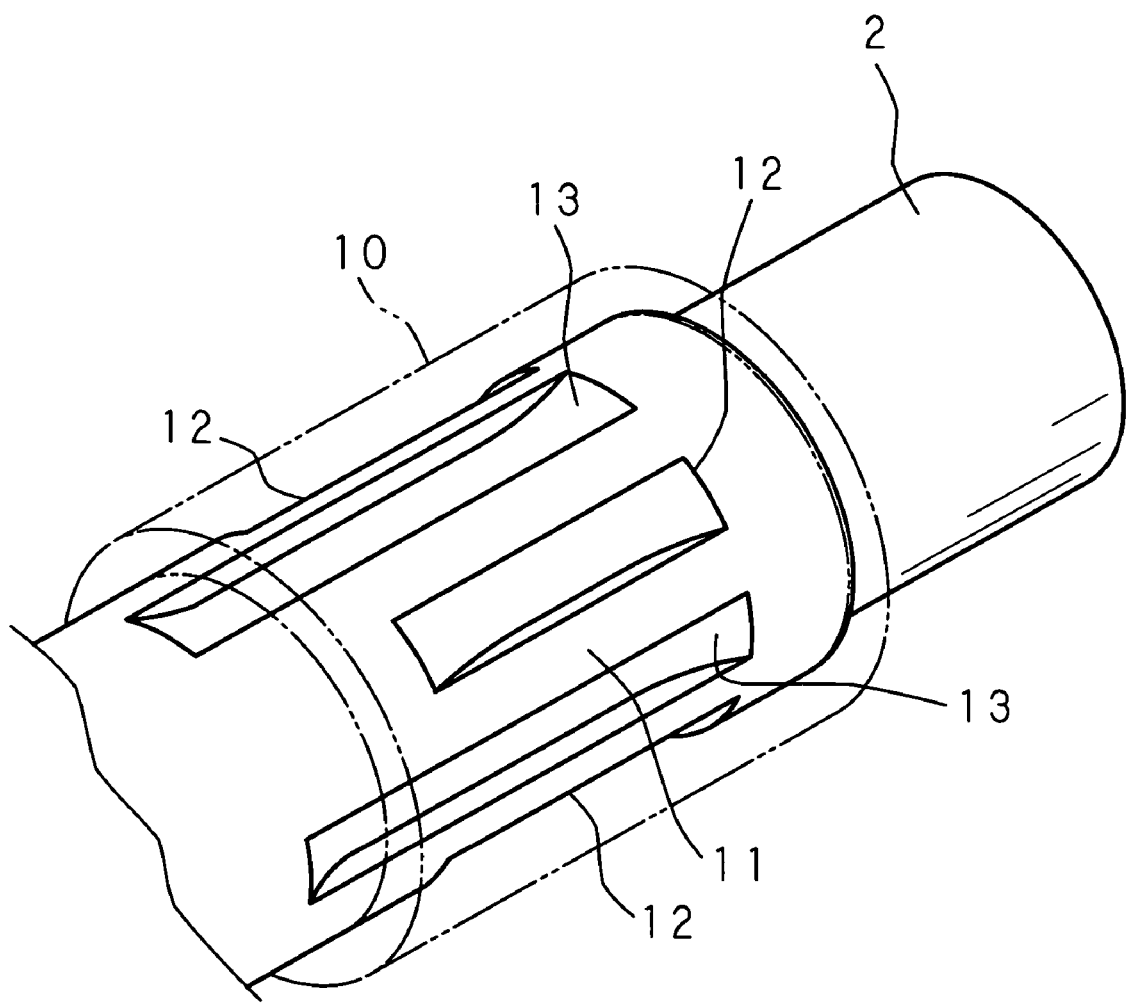
FIG. 2 is a perspective view showing the configuration of oil grooves in the outer periphery of a valve spool.

FIG. 2 is a perspective view showing the configuration of the oil grooves in the outer periphery of the valve spool 11. As shown in the figure, in the outer periphery surface of the valve spool 11 a plurality of oil grooves extending in the axial direction are aligned approximately at equal intervals in the circumferential direction. Among these, a half number of oil grooves located alternately have a length contained within the fitting region of the valve body 10 indicated by dashed-and-double-dotted lines in the figure, and thereby serve as oil supply grooves 12, 12, . . . in communication with the oil hydraulic pump P as described above.

On the other hand, the rest half number of oil grooves are longer than the oil supply grooves 12, 12, . . . and extend toward one side beyond the fitting region of the valve body 10, and thereby serve as oil drain grooves 13, 13, . . . in communication with the oil tank T via the drain oil chamber 23 as described above.

In a neutral state that no torsion is caused in the torsion bar 4, the valve body 10 and the valve spool 11 are position-adjusted (centering adjustment) in the circumferential direction in such a manner that the throttle sections between the oil grooves along the fitting circumference should have the same throttle area with each other. In this state, the pressure oil supplied from the oil hydraulic pump P through the oil supply port 20 is introduced equally into the adjacent oil feed grooves via the throttle sections having the same area on both sides of the oil supply grooves 12, and then introduced into the oil drain grooves 13 adjacent on the other side via the throttle sections on the other side having the same area. After that, the pressure oil is discharged through the drain oil chamber 23 and the drain oil port 24 to the oil tank T. At that time, no pressure difference arises between the cylinder chambers SL and SR each in communication with the oil feed grooves. Thus, the power cylinder generates no force.

In contrast, when a steering torque is applied to the steering member not shown, this steering torque is transmitted to the input shaft 2, then transmitted to the output shaft 3 via the torsion bar 4, and then converted into movement in the axial direction of the rack shaft 32 engaging with the pinion 31 in the lower half part, so that steering is performed. At that time, between the input shaft 2 and the output shafts 3, that is, between the valve spool 11 and the valve body 10, relative angular displacement arises in response to steering torque, with causing torsion in the torsion bar 4. This causes a change in the throttle areas of the throttle sections aligned along the fitting circumferences of the valve body 10 and the valve spool 11.

The change in the throttle areas is such that the throttle area on one side among the two sides of each oil groove is reduced, while the throttle area on the other side is increased. Thus, the pressure oil supplied to the oil supply groove 12 goes mainly through the throttle section on one side having an increased throttle area, and then enters mainly into the oil feed groove on the one side. Thus, a pressure difference arises between one cylinder chamber SL (or SR) in communication with one oil feed groove via one cylinder port 21 (or 22) and the other cylinder chamber SR (or SL) in communication with the other oil feed groove via the other cylinder port 22 (or 21). Accordingly, the power cylinder generates an oil pressure force corresponding to this pressure difference. This oil pressure force is applied as a steering assist force to the rack shaft 32.

Further, at that time, the hydraulic fluid is excluded from the other cylinder chamber SR (or SL), then flows back to the other oil feed groove via the corresponding cylinder port 22 (or 21). After that, the hydraulic fluid is introduced into the oil drain groove 13 via the throttle section having the increased throttle area on the one side of the oil feed groove, and then discharged through the drain oil chamber 23 and the drain oil port 24 to the oil tank T.

Figure 3:
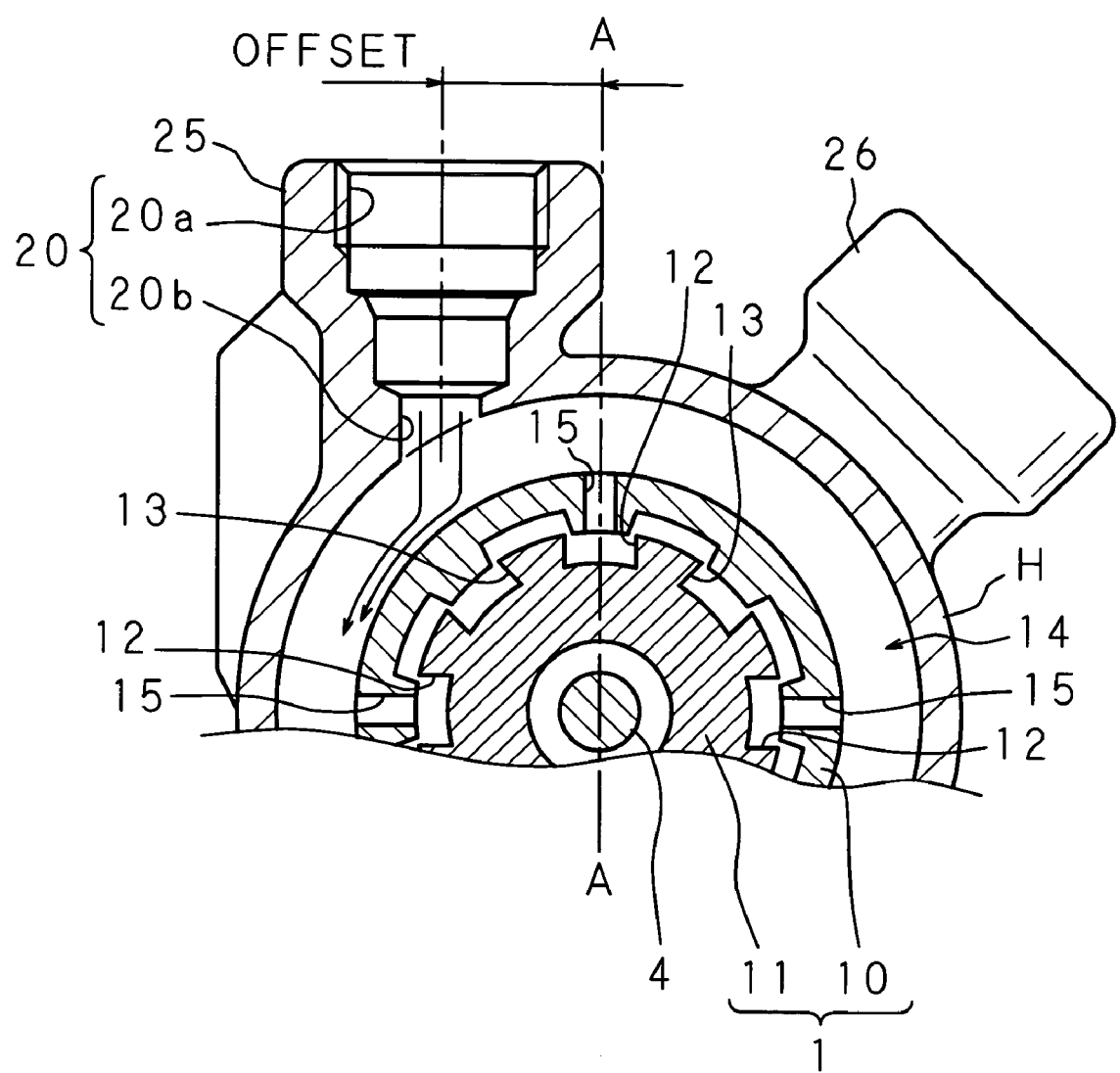
FIG. 3 is an expanded transverse sectional view taken along line III-III of FIG. 1.
Figure 4:
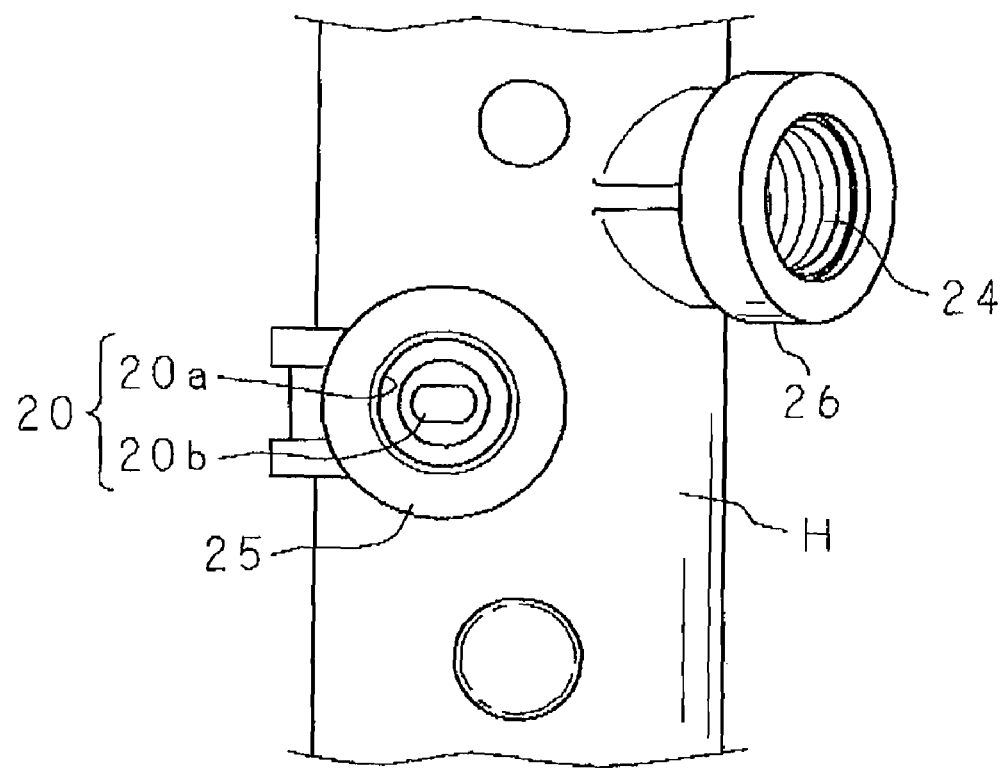
FIG. 4 is a diagram taken along line IV-IV of FIG. 1.

FIG. 3 is an expanded transverse cross section taken along line III-III of FIG. 1. FIG. 4 is a diagram taken along line IV-IV of FIG. 1, showing the configuration of the oil supply port 20 which is a feature of the hydraulic power steering apparatus according to the present invention. As shown in FIG. 3, in the outer periphery of the housing H, a pump seat 25 protrudes outward approximately in parallel to the center line A at a position having an offset of an appropriate distance toward one side relative to a center line A that passes through the axis center of the housing H and the valve body 10 supported and fitted therein. Then, an oil supply port 20 penetrates through the center of the pump seat 25. Moreover, the drain oil port 24 penetrates through the center of a pump seat 26 protruding from the housing H.

As shown in FIG. 3, the oil supply port 20 comprises: a fixing hole 20a which has an opening at an end face of the pump seat 25 and which is threaded in the inner periphery and thereby permits connector jointing with an oil feed piping from the oil hydraulic pump P; and a communicating hole 20b formed in a deep inside of the fixing hole 20a and in communication with the inside of the housing H. As shown in FIG. 4, the communicating hole 20b is an elongate hole having an elliptic cross section having the major axis in the offset direction of the pump seat 25.

As shown in FIG. 1, the opening position of the communicating hole 20b on the inner periphery side of the housing H faces a circumferential groove 14 provided in the outer periphery surface of the valve body 10. The circumferential groove 14 is in communication with the oil supply grooves 12, 12, . . . arranged in the outer periphery surface of the valve spool 11 that faces the inner face of the valve body 10, by means of oil supply holes 15, 15, . . . formed by penetrating at appropriate positions in the bottom.

The oil supply port 20 having the configuration described above is used when the high-pressure hydraulic fluid fed from the oil hydraulic pump P serving as an oil pressure generation source is supplied to the oil pressure regulating valve 1 provided with the valve body 10 and the valve spool 11 from the outside of the housing H. Here, as described above, the oil supply port 20 has an offset relative the center line A of to the housing H and the valve body 10 in the inside thereof. Further, the oil supply port 20 faces the outer periphery surface of the valve body 10 through the communicating hole 20b formed in the shape of an elongate hole which is long in the direction of offset. Thus, as indicated by an arrow in FIG. 3, the high-pressure hydraulic fluid supplied through the oil supply port 20 collides slantwise with a wider area of the bottom surface of the circumferential grove 14 provided around the outer periphery surface of the valve body 10, and then flows toward one side along the curved bottom surface.

This reduces remarkably the flow sound generated when the hydraulic fluid supplied into the housing H through the oil supply port 20 collides with the outer periphery surface of the valve body 10, more specifically, with the bottom surface of the circumferential groove 14 provided around the outer periphery of the valve body 10.

The hydraulic fluid supplied as described above flows into the valve body 10 via the oil supply holes 15, 15, . . . , and then introduced separately into each of the oil supply grooves 12, 12, . . . aligned along the outer periphery of the valve spool 11. After that, as described above, the hydraulic fluid flows into the rest oil drain grooves 13, 13, . . . aligned along the outer periphery of the valve spool 11 via the throttle sections arranged on both sides of each of the oil supply grooves 12, 12, . . . . Then, the hydraulic fluid is discharged through the drain oil chamber 23 and the drain oil port 24 to the external oil tank T.

Here, the oil drain-grooves 13, 13, . . . according to the embodiment extend beyond the fitting region of the valve body 10, and thereby are in direct communication with the inside of the drain oil chamber 23. This simplifies the flow of the drain oil described above, and hence reduces the flow sound associated with the flow. Further, the flow sound associated with the flow through the throttle sections aligned along fitting circumferences of the valve body 10 and the valve spool 11 can be reduced by a configuration proposed in the prior art. As a result, in the hydraulic power steering apparatus according to the present invention, the flow sound generated in the oil pressure regulating valve 1 is reduced in a wide range, so that quiet operation is achieved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A hydraulic power steering apparatus, comprising:
    an oil pressure regulating valve of rotary type that is provided inside a housing having a cylindrical shape for supporting a steering shaft rotating in response to steering and that supplies and discharges pressure oil fed from an oil pressure generation source, to and from a power cylinder for steering assist; and
    an oil supply port that is located at a position having an offset toward one side relative to a center axis of the housing in order to supply the pressure oil to the oil pressure regulating valve and that is formed in a shape of a hole elongate in the direction of the offset.

2. The hydraulic power steering apparatus set forth in claim 1, wherein
    the oil supply port comprises, as the elongate hole, a communicating hole in communication with the inside of the housing.

3. The hydraulic power steering apparatus set forth in claim 2, wherein
    the communicating hole has a cross section of elliptic shape having a major axis in the direction of offset.

4. The hydraulic power steering apparatus set forth in claim 2, wherein
    the oil pressure regulating valve comprises: a valve body having a cylindrical shape retained by the housing; and a valve spool formed integrally with the steering shaft fitted into the valve body, and wherein
    the opening position of the communicating hole faces a circumferential groove provided in an outer periphery surface of the valve body while the circumferential groove is in communication with an oil supply groove in an outer periphery surface of the valve spool.

5. The hydraulic power steering apparatus set forth in claim 1, wherein
    the oil pressure regulating valve comprises: a valve body having a cylindrical shape retained by the housing; and a valve spool formed integrally with the steering shaft fitted into the valve body, wherein
    an inner periphery of the valve body and an outer periphery of the valve spool are each provided with a plurality of oil grooves that extend in an axial direction and that are aligned in a circumferential direction, while the oil grooves provided in the inner periphery of the valve body are in communication with the power cylinder, while a part of the oil grooves provided in the outer periphery of the valve spool are in communication with the oil pressure generation source via the oil supply port, and while the rest of the oil grooves are in communication with a drain oil chamber inside the housing, and wherein
    the oil grooves in communication with the drain oil chamber extend beyond a fitting region of the valve body.

* * * * *